May 26, 1953  S. M. RISVOLD ET AL  2,639,813
BICYCLE RACK
Filed June 8, 1951
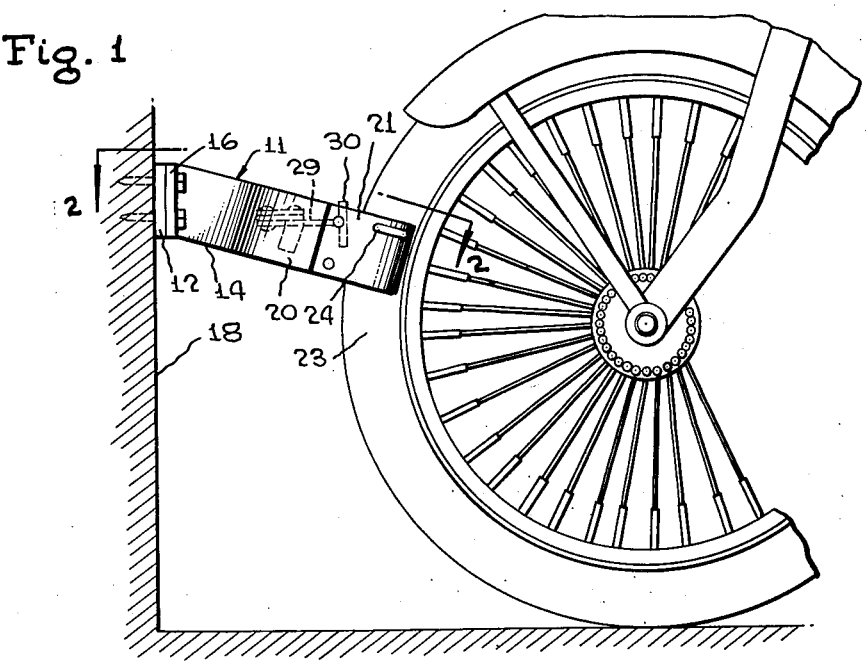
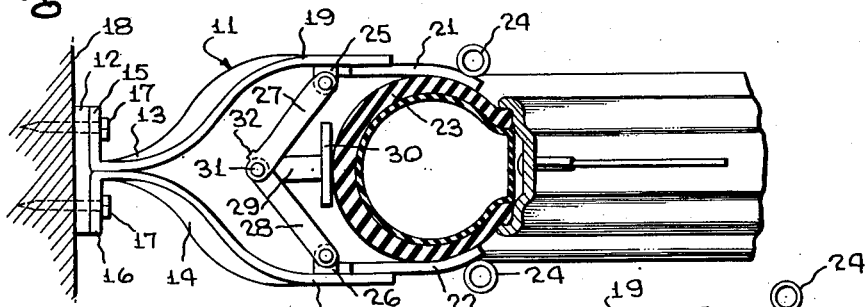
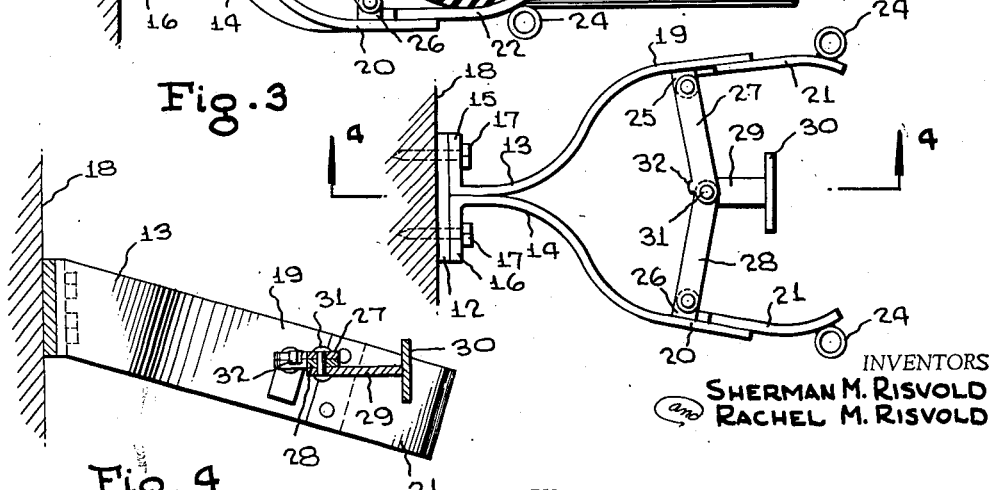
INVENTORS
SHERMAN M. RISVOLD
and RACHEL M. RISVOLD
BY
McMorrow, Berman & Davidson
ATTORNEYS Patented May 26, 1953

2,639,813

UNITED STATES PATENT OFFICE 2,639,813

BICYCLE RACK

Sherman M. Risvold and Rachel M. Risvold, Huxley, Iowa

Application June 8, 1951, Serial No. 230,614

3 Claims. (Cl. 211—19)

This invention relates to bicycle holders, and more particularly to a bicycle rack of the type adapted to engage a bicycle wheel to support the bicycle in an upright position.

A main object of the invention is to provide a novel and improved bicycle rack device which is simple in construction, which may be installed on any vertical surface adjacent to which it is desired to secure a bicycle in an upright position, and which involves a small number of parts.

A further object of the invention is to provide an improved bicycle holder which is inexpensive to manufacture, which is sturdy in construction, which is compact in size, and which is substantially automatic in operation.

Further objects and advantages of the invention will become apparent from the following description and claims, and from the accompanying drawings, wherein:

Figure 1 is a side elevational view of the rear portion of a bicycle shown engaged with an improved bicycle rack constructed in accordance with the present invention;

Figure 2 is an enlarged cross-sectional view taken on the line 2—2 of Figure 1;

Figure 3 is a top plan view of the bicycle rack device of Figures 1 and 2, shown in open position;

Figure 4 is a cross-sectional view taken on the line 4—4 of Figure 1.

Referring to the drawings, the improved bicycle rack device is designated generally at 11. The rack device comprises a supporting plate 12 to which are secured the respective resilient arms 13, 14 in side-by-side relationship, said arms being formed with the respective end flanges 15 and 16 which are secured to the plate member 12. Suitable fasteners 17 extend through the respective flanges 15 and 16 and the plate member 12 into a vertical supporting wall 18, thereby rigidly securing the rack device to the wall. As shown in Figure 1, the arms 13 and 14 are downwardly inclined from the supporting plate 12, and the free portions of said arms are bowed outwardly to define opposed spaced jaws 19 and 20. Secured to the inside surfaces of the jaws 19 and 20 adjacent their ends are the respective opposing curved plate members 21 and 22 which are shaped to engage around a bicycle tire 23 in the manner shown in Figure 2. Secured to the ends of the respective plate members 21 and 22 are the ring elements 24 which are employed as handles for spreading apart the jaw elements of the rack device when it is desired to remove the bicycle from the device.

The jaw elements 19 and 20 are formed with the inwardly extending lugs 25 and 26, and pivoted to said lugs are the respective link members 27 and 28. Designated at 29 is a forwardly extending bar member formed at its forward end with the transverse, vertical head 30. The inner ends of the link members 27 and 28 and the inner end of the bar member 29 are pivotally connected together by a vertical rivet 31. The link member 27 is formed with a depending lug element 32 located adjacent the rivet 31, said lug element 32 being engageable with the link member 28 to limit counterclockwise rotation of link member 27 with respect to link member 28 to the positions thereof shown in Figure 3.

In setting the rack device to receive the tire 23 of the bicycle wheel, the jaws 19 and 20 are spread apart and the link members 27 and 28 are arranged in the position of Figure 3, wherein the pivot member 31 is moved forwardly beyond its dead center position. When thus arranged, the bar member 29 extends forwardly and the abutment plate 30 is in a position to be readily engaged by the tire 23 of the bicycle wheel. The tire 23 is brought against the plate member 30, and urged inwardly thereagainst, causing the link members 27 and 28 to be rotated inwardly and causing the pivot member 31 to be moved inwardly past its dead center position. This releases the spring arms 13 and 14 and causes the clamping elements 21 and 22 to engage around the tire 23, the parts assuming the positions shown in Figure 2. In said positions the wheel of the bicycle is securely held by the rack device, and the bicycle is supported in an upright position. To disengage the rack device, it is merely necessary to pull outwardly on the rings 24, 24, whereby the clamping elements 21, 22 are disengaged from the tire 23 and the bicycle is free to be moved away from the rack device.

It will be noted that when the rack device is set in the position of Figure 3, it is merely necessary to move the wheel of the bicycle against the abutment plate 30 with sufficient force to move the pivot member 31 inwardly beyond its dead center position, whereupon the spring arms will be released and clampingly engage the tire 23 of the bicycle wheel.

While a specific embodiment of an improved bicycle holder has been disclosed in the foregoing description, it will be understood that various modifications within the spirit of the invention may occur to those skilled in the art. Therefore, it is intended that no limitations be placed on

What is claimed is:

1. A bicycle holder comprising a support, a pair of resilient arms secured to said support in side-by-side relation, the free portions of said arms being bowed outwardly to define opposed, spaced jaws adapted to receive the periphery of a bicycle wheel therebetween, a pair of pivotally connected toggle links connecting said jaws, and an outwardly facing abutment member pivotally secured to the junction of said links, said jaws being arranged to clamp the wheel therebetween responsive to inward movement of said abutment member by the wheel.

2. A bicycle holder comprising a support, a pair of resilient arms secured to said support in side-by-side relation, the free portions of said arms being bowed outwardly to define opposed, spaced jaws adapted to receive the periphery of a bicycle wheel therebetween, a first inwardly extending toggle link pivotally connected to one of said arms, a second inwardly extending toggle link pivotally connected to the other arm, a forwardly facing abutment member, and common hinge means pivotally connecting the inner ends of the toggle links and the inner end portion of the abutment member, said jaws being arranged to clamp the wheel therebetween responsive to inward movement of said abutment member by the wheel, and said toggle links being arranged to at times hold said arms in spread-apart relation with the abutment member in a forwardly advanced position.

3. A bicycle holder comprising a support, a pair of resilient arms secured to said support in side-by-side relation, the free portions of said arms being bowed outwardly to define opposed, spaced jaws adapted to receive the periphery of a bicycle wheel therebetween, a first inwardly extending toggle link pivotally connected to the intermediate portion of one of said arms, a second inwardly extending toggle link pivotally connected to the intermediate portion of the other arm, a forwardly facing abutment member, common hinge means pivotally connecting the inner ends of the toggle links and the inner end portion of the abutment member, and respective eye lugs on the ends of said arms, said jaws being arranged to clamp the wheel therebetween responsive to inward movement of said abutment member by the wheel, and said toggle links being arranged to at times hold said arms in spread-apart relation with the abutment member in a forwardly advanced position.

SHERMAN M. RISVOLD.
RACHEL M. RISVOLD.

References Cited in the file of this patent

UNITED STATES PATENTS

| Number | Name | Date |
|---|---|---|
| 621,072 | Gregory | Mar. 14, 1899 |
| 983,102 | Werline | Jan. 31, 1911 |